United States Patent

Agaraharam et al.

(10) Patent No.: US 6,483,899 B2
(45) Date of Patent: *Nov. 19, 2002

(54) VOICE MESSAGING SYSTEM

(75) Inventors: Sanjay Agraharam, Marlboro, NJ (US); Randy G. Goldberg, Princeton, NJ (US); Robert Edward Markowitz, Glen Rock, NJ (US); Kenneth H. Rosen, Middletown, NJ (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,607

(22) Filed: Jun. 19, 1998

(65) Prior Publication Data

US 2002/0067808 A1 Jun. 6, 2002

(51) Int. Cl.[7] .......................... H04M 11/00; G10L 15/26
(52) U.S. Cl. ............................ 379/88.14; 378/88.13; 378/88.22; 378/93.24; 378/100.13; 704/235; 704/260; 704/270
(58) Field of Search .................. 379/88.13, 88.14, 379/100.01, 67.1, 100.08, 88.18, 230, 100.13, 88.22, 93.24; 704/235, 260, 270, 231, 251

(56) References Cited

U.S. PATENT DOCUMENTS

| | | | |
|---|---|---|---|
| 5,608,786 A | | 3/1997 | Gordon ................. 379/100.08 |
| 5,689,550 A | * | 11/1997 | Garson et al. ........... 379/88.18 |
| 5,712,903 A | * | 1/1998 | Bartholomew et al. ..... 379/230 |
| 5,742,905 A | * | 4/1998 | Pepe et al. ................ 455/461 |
| 5,802,466 A | * | 9/1998 | Gallant et al. ............. 455/413 |
| 5,822,405 A | * | 10/1998 | Astarabadi ............... 379/88.18 |
| 5,825,854 A | * | 10/1998 | Larson et al. ............ 379/88.14 |
| 5,920,835 A | * | 7/1999 | Huzenlaub et al. ......... 704/235 |
| 5,987,100 A | * | 11/1999 | Fortman et al. ......... 379/88.14 |
| 6,023,700 A | * | 2/2000 | Owens et al. .............. 455/412 |
| 6,058,164 A | * | 5/2000 | Ibuka et al. .............. 379/67.1 |
| 6,061,718 A | * | 5/2000 | Nelson ....................... 709/206 |
| 6,064,723 A | * | 5/2000 | Cohn et al. ............. 379/88.14 |
| 6,072,862 A | * | 6/2000 | Srinivasan ............. 379/100.08 |
| 6,075,844 A | * | 6/2000 | Goldberg et al. ........ 379/88.17 |
| 6,085,231 A | * | 7/2000 | Agraharam et al. ..... 379/88.22 |
| 6,161,082 A | * | 12/2000 | Goldberg et al. ............. 709/3 |
| 6,173,259 B1 | * | 1/2001 | Bijl et al. .................... 704/235 |
| 6,219,638 B1 | * | 4/2001 | Padmanabhan et al. ..... 704/235 |

* cited by examiner

Primary Examiner—Fan Tsang
Assistant Examiner—Ovidio Escalante

(57) ABSTRACT

A network-based voice messaging system is provided. A voice message is received at a network. The network converts the voice message into a text message by utilizing speech recognition software. The text message is transmitted to the intended recipient as an electronic mail (e-mail) message or facsimile document and is received by the intended recipient on conventional text receiving equipment.

13 Claims, 2 Drawing Sheets

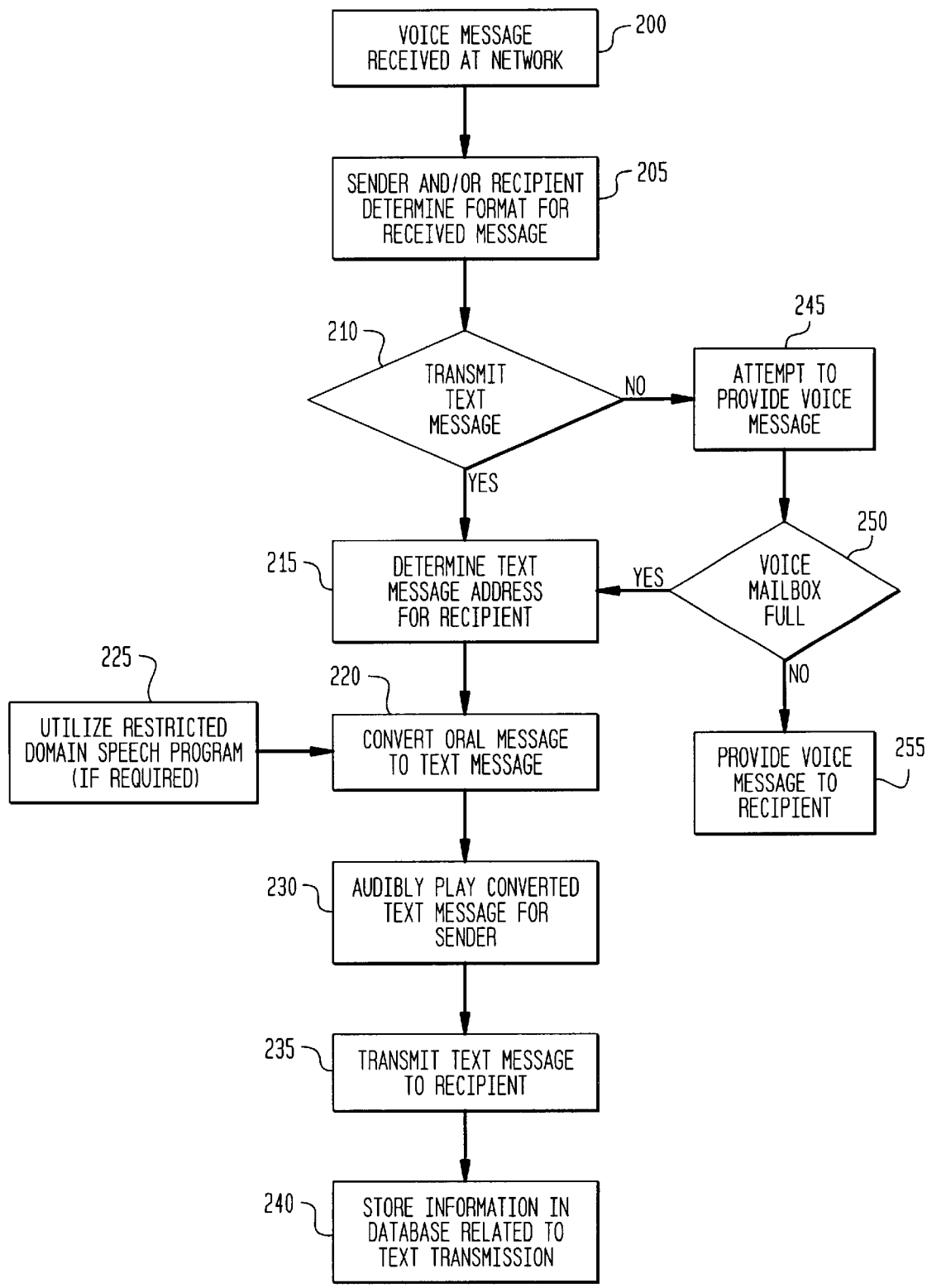

VOICE MESSAGING SYSTEM

BACKGROUND OF THE INVENTION

The present invention relates to a method and apparatus for processing and transmitting a voice message. More specifically, the invention provides for converting a voice message to a text message and transmitting the text message to the intended recipient. A service provider network receives the voice message transmitted by the sender and converts the message into a text format. The network then transmits the text message to the intended recipient.

Currently, it is possible for a sender of a message to send text messages to an intended recipient. These messages can be electronic mail messages that are generated on the personal computer of the sender and transmitted over a network to the intended recipient's personal computer. Alternatively, these text messages can be documents that are transmitted to the intended recipient by utilizing a facsimile machine. However, with both of these known methods for sending a text message to an intended recipient, the sender of the message must have access to transmission equipment that is capable of sending the text message, e.g., a personal computer or a facsimile machine.

The sender of a message who wants to send a text message to an intended recipient may not always have access to conventional text transmission equipment. For example, a sending party that wants to send an e-mail message to an intended recipient could be at an airport and thus not have access to conventional e-mail transmission equipment. Therefore, it would be desirable to provide a capability where a person who desires to transmit a text message to an intended recipient could send the text message to the intended recipient without requiring the sender to have access to conventional transmission equipment for sending text messages.

Currently, it is also possible for an intended recipient of a voice mail message to receive the voice mail message from the sending party. However, as with the situation above where the sender of a text message must have access to conventional transmission equipment, the intended recipient of a voice mail message must have access to a conventional telephone in order to receive the voice mail message. As such, it may not always be possible for the intended recipient of a voice mail message to receive the message at a time when desired. Therefore, it would also be desirable to provide a capability to receive a voice mail message where the person who desires to receive the voice mail message does not have access to a conventional telephone.

SUMMARY OF THE INVENTION

The present invention overcomes the drawbacks in the above-described communication scenarios. In accordance with the present invention, a network-based voice messaging system is provided. The system provides the capability to convert a voice mail message to a text message.

A voice message is received at a network. The network converts the voice message into a text message by utilizing known speech recognition software. The text message is transmitted to the intended recipient as an electronic mail (e-mail) message or facsimile document and is received by the intended recipient on conventional text receiving equipment. Thus, a sending party that desires to send a text message but who does not have access to conventional text transmission equipment could utilize a telephone connected to a network to provide a voice message for an intended recipient. The network would convert the voice message into a text message and transmit the text message to the intended recipient. In the second situation where an intended recipient of a voice message desires to receive the message but does not have access to a conventional telephone, the intended recipient could have the network convert the voice message to a text message and transmit the text message to the personal computer or facsimile machine of the intended recipient.

BRIEF DESCRIPTION OF THE DRAWINGS

FIG. 2 illustrates a process flow chart for the method steps in practicing an embodiment of the present invention.

DETAILED DESCRIPTION

Figure 1:
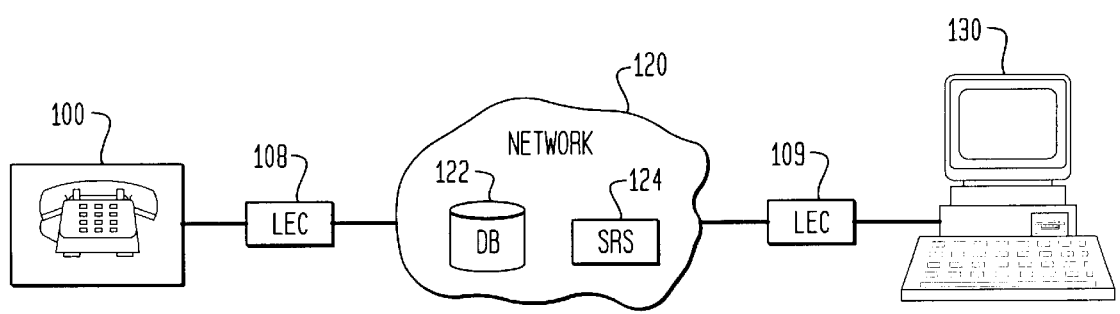
FIG. 1 illustrates an embodiment for the voice messaging system of the present invention.

FIG. 1 illustrates a functional block diagram for one embodiment of the network-based voice messaging system of the present invention. A voice message, or oral message, is input into network 120 by utilizing telephone 100. Telephone 100 is connected to network 120 through local exchange carrier switch 108. Upon receipt of the voice message at network 120, network 120 will convert the voice message into a text message by utilizing known speech recognition software 124, which is stored in network 120. After network 120 converts the voice message to a text message, network 120 transmits the text message to the intended recipient's receiving apparatus 130, such as by connection through LEC switch 109, where the message is received by the intended recipient.

Network 120 may be an integrated services provider network or a telephone network. As such, network 120 provides interconnection between the sender's telephone 100 and the intended recipient's receiving apparatus 130. Network 120 is capable of converting the voice message into a variety of different types of text messages by utilizing speech recognition software 124 and standardized text formatting software. For example, network 120 is capable of converting the input voice message into either an electronic mail (e-mail) message or a text document to be transmitted as a facsimile document. Network 120 contains transmission equipment to transmit the converted text message to the intended recipient's receiving apparatus 130.

The intended recipient's receiving apparatus 130 may be a variety of different types of equipment, e.g., a personal computer or a facsimile machine. All that is required is that the apparatus be capable of receiving the particular type of text-formatted message that is transmitted by network 120, for example, a personal computer for receiving electronic mail (e-mail) messages or a facsimile machine for receiving fax documents. For purposes of illustration, the present invention will be described in an embodiment where the voice message is converted into an electronic mail message and transmitted to the intended recipient's personal computer 130.

In continuing with the description of an embodiment of the present invention, the invention has utility for a person who desires to send an electronic mail message to an intended recipient but who does not have access to an electronic mail transmission device. In order to send an electronic mail message to an intended recipient in this circumstance, the sending party, who is a subscriber to network 120, dials into network 120 by utilizing telephone 100. After dialing into network 120, network 120 will ask the calling party if they would like to place a voice phone call or would like to send an electronic mail message. If the calling party desires to place a voice phone call, the calling party will be prompted to dial the phone number of the desired party and network 120 will attempt to establish the phone connection. If the calling party desires to send an electronic mail message, the network will prompt the calling party for information in order to compose and transmit the e-mail message.

When sending an electronic mail message to an intended recipient, the sending party must identify the intended recipient for the e-mail message so that the intended recipient's e-mail address can be determined. There are many possible ways for identifying who the intended recipient is. All that is required is that an electronic mail address for the recipient be ultimately determined. The easiest method for determining this information is for the sender to directly input the e-mail address for the recipient into the network when recording the voice message. Network 120 can prompt the calling party to input the intended recipient's e-mail address. The calling party can input the e-mail address by speaking the e-mail address into network 120 and having speech recognition software 124 interpret the spoken e-mail address, or the sending party could enter the recipient's e-mail address by utilizing the telephone's keypad.

Alternative methods for determining the e-mail address for the recipient could be for the sender to input other information identifying the recipient into the network. For example, the sender could speak the recipient's name into the network. If this methodology was utilized, the network would utilize this information to access database 122 to correlate the name of the recipient to an e-mail address for the recipient.

Database 122 contains identification information for potential recipients. This identification information could be, as previously mentioned, the name of the recipient. As such, the sender can enter any identification information for the intended recipient into the network and the network would utilize this information to obtain the correct e-mail address for the recipient by accessing database 122. The only requirement is that the identification information entered by the sender must also be stored in database 122 so that correlation of the identification information to an e-mail address can be accomplished.

Information can be input to database 122 by either the calling party or by the network itself. The network can provide for entering information into database 122 by utilizing, for example, subscriber information provided to the network if the intended recipient is also a subscriber to the network or by having the network service provider enter information that is obtained from personal data lists that are commercially available. Additionally, information is also input to network database 122 through normal use of the present invention. For example, when a sender sends an e-mail document to an intended recipient, all information entered by the sender into network 120 when sending the message is automatically entered into the database. In this manner, information is input to database 122 through normal use of the system by the subscriber, and thus does not necessarily have to be input by a separate data input step that is specifically intended for inputting information into the database.

In the situation where there is either no information contained in database 122 for an intended recipient or where there is information contained in the database for a particular intended recipient, e.g., the name of the intended recipient, but there is no e-mail address available for the intended recipient, the sending party will be provided with the recognized name of the intended recipient, as recognized by speech recognition software 124, and will be prompted to provide an e-mail address for the intended recipient.

In order to compose an e-mail message for transmission to an intended recipient, the sender will orally speak the message to be delivered into network 120. As mentioned previously, network 120 contains speech recognition software 124. Speech recognition software 124 will convert the oral message into a text format by utilizing known speech-to-text conversion software. Once the oral message is converted into a text format, network 120 will format the text-formatted document into an e-mail message and transmit the e-mail message to the intended recipient by utilizing the intended recipient's e-mail address, which has been determined through the process as described previously.

Currently known speech recognition software has limitations with respect to the library of words that can be recognized. For example, not all voice recognition software programs will be able to recognize words that relate solely to a particular segment of the population. For example, words that are commonly used by medical personnel are not usually words that are commonly used in the general population. Therefore, most general purpose voice recognition systems will not contain these words in their database. However, there are voice recognition systems that are specifically designed to be utilized with speech that is specific to a particular segment of the population. These voice recognition systems are generally known as restricted domain systems.

Because a particular sending party may desire to send a message that contains words that may not be contained in a general purpose speech recognition software program, but that may only be contained in a "restricted domain" speech recognition program, network 120 contains restricted domain speech recognition programs. Network 120 will query the sending party as to whether they desire to utilize a restricted domain speech recognition program. If the sending party realizes that their message contains words that are not commonly used, the sending party would select from a menu of restricted domains that would be provided to the sending party by network 120. The sending party would then select the restricted domain appropriate to their message and network 120 would utilize this restricted domain voice recognition program to recognize the speech of the sending party.

If the sending party does not select a restricted domain software program upon call initiation and the network is not able to recognize the spoken message of the sending party because it contains words that are not contained in the general purpose speech recognition software, the network will inform the sender that the speech cannot be recognized and will prompt the user to select a restricted domain for speech interpretation that may possibly contain the spoken words.

After the network composes the electronic mail message by interpreting and converting the voice message, and before transmitting the e-mail message, network 120 will audibly provide the sending party with the name, e-mail address, and message content of the e-mail message as converted from the voice message of the sender. The name that network 120 provides to the sender for verification is the name that is recognized and interpreted by the speech recognition software as input by the sender. The e-mail address is that address either accessed from database 122 or input by the sender. The message content of the e-mail message is the converted voice message as input by the sender. By reviewing this information, the sending party is able to verify that the speech recognition software accurately recognized and converted the voice message as input by the sender.

The sender can modify any incorrect information in the e-mail message before transmission of the e-mail message. The sending party can input corrected information for the intended recipient by speaking corrected information into network 120.

When the text document is transmitted to the intended recipient, the e-mail address of the sending party is included in the e-mail message. This feature is desirable to enable the recipient to reply to the e-mail.

In an alternative embodiment, when sending the e-mail message to the intended recipient, it is not required that network 120 convert the actual spoken message of the sending party into a text message for transmission as an electronic mail message. Network 120 could instead generate an electronic mail message for the intended recipient and attach the actual subject matter of the message as a wave audio file (.wav) attachment to the e-mail message. In this manner, network 120 would convert and save the oral message as an electronic file, attach the file to the e-mail message that is generated by network 120, and transmit the e-mail message and attached file to the intended recipient. Thus, network 120 would not be required to convert the spoken message into a text message but rather would only be required to save the spoken message as an electronic file and attach this file to the e-mail message. This elimination of the requirement to interpret and convert the spoken message to a text message would reduce the capabilities required of the speech recognition software because the speech recognition software now would only be required to interpret the addressing information spoken by the sender and not the actual subject matter of the spoken message. If network 120 also had access to other electronic files of the sender, e.g., those saved on a web page of the sender, the sender could also attach these files to the e-mail message for transmission to the intended recipient as well.

After the text message is transmitted, network 120 will notify the sender of the status of transmitting the message to the intended recipient while the sender is still connected to the network. The network will notify the sender as to whether the transmission was successful or not.

As mentioned previously, the present invention also has utility for an intended recipient of a voice message who does not have access to a telephone for receiving the voice message. In order to receive a voice message as an electronic mail message instead, the receiving party, who is a subscriber to network 120, provides information to network 120 that the recipient desires to receive voice messages as electronic mail messages. A voice messaging service is provided to the subscriber, i.e., the intended recipient, by network 120. The intended recipient's desires for the format for receipt of voice messages can be stored in database 122.

In operation, when a calling party attempts to place a call to the intended recipient and the intended recipient does not answer the call, network 120 provides the calling party with the opportunity to leave a message for the called party. Network 120 will query the calling party as to whether the calling party desires to leave a message for the called party. If the calling party does desire to leave a message for the called party, network 120 will check database 122 to determine if the called party desires to receive messages as voice messages or as electronic mail messages. It is desired to determine this in advance of the calling party actually leaving a message for the called party because if the called party desires electronic mail messages, network 120 may have to prompt the calling party for selection of a restricted domain for speech recognition software, as described previously. This may be desirable in order for network 120 to be able to accurately interpret the voice message by utilizing speech recognition software 124.

If the called party has not specifically designated that they desire to receive voice messages as e-mail messages, but upon checking the desires of the intended recipient the network determines that the voice mail box of the intended recipient is full, a default instruction could be provided to the network to transmit the message to the recipient as an e-mail message in this circumstance. In this manner, instead of the calling party not being able to leave any message for the called party because the called party's voice mail box is full, the calling party would still be able to transmit a message for the called party as an e-mail message.

After transmission of a text message, either at the direction of the sender or the intended recipient, network 120 stores information related to the transmission of the text message in database 122. This information can be data that indicates the time of the transmission, the time required for transmitting the message, the sender of the document, the recipient, the cumulative number of documents transmitted by a particular sender or received by a particular recipient in any given time period, and the method of transmission, e.g., e-mail message or fax document. Additional information can be stored depending upon the requirements of the sender, the recipient, and the network service provider. This information can be utilized for accounting purposes or for a variety of other purposes.

There are a variety of methods available for billing subscribers for use of this network-based voice messaging system. The system could either charge for each message or could provide for an unlimited number of messages for a set billing amount. Alternatively, the service provided by the system can be provided as part of a larger service package and thus not be billed as a separate service.

If the service is to be separately billed and if there is to be a charge for each message transmission, various methods are possible to account for, and thus bill for, each message transmission. The party that designates that a particular voice message be transmitted as a text document could be billed for the service. That is, if the intended recipient is the network subscriber and the recipient desired that the voice message be transmitted to them as a text message, the intended recipient could be billed for the service. If the sender of the text message is the subscriber to the network and desired that the message be sent as a text message, the sender could be charged for the service.

Billing and payment for the service, if the service is separately billed, can be accomplished in a variety of ways. The subscriber could enter a credit card number into the network at the time of each document transmission, the charges could be separately billed to the account holder on a regular basis, or the charges could be included in the account holder's home or office phone bill.

FIG. 2 provides the process steps for practicing an embodiment of the present invention. Step 200 indicates the step where a voice message is received at a service provider network. As previously disclosed, the network may be, for example, a telephone network or an integrated services network. In step 205, the sender and/or the intended recipient will determine the format required for the received message. Based on the desires of the sender and/or the intended recipient, the network will determine if a text message is to be transmitted to the intended recipient, step 210. If a text message is to be transmitted to the intended recipient, the network will determine the text message address for the recipient, step 215, and convert the oral message into a text message by utilizing known speech to text conversion software, step 220. As previously disclosed, if the message contains words that may not be contained in a general purpose speech recognition software program, a restricted domain program may be utilized, step 225.

After conversion of the voice message into a text message, the network will audibly play the converted text message for the sending party so that the sending party can perform error correction on the converted message, step 230, if required. In step 235, the network will transmit the text message to the intended recipient and in step 240 the network will store information related to the transmitted text document in a database.

As stated previously, if a text message is not to be transmitted in response to step 210, the network will attempt to provide a voice message to the intended recipient, step 245. The network will determine if the voice mail box of the recipient is full, step 250. If the voice mail box for the intended recipient is full, the network will provide a text message to the intended recipient in accordance with steps 215–240. If the voice mail box is not full, a voice message will be provided to the intended recipient, step 255.

Several variations on the disclosed embodiments are contemplated. In the disclosed embodiments, the network is disclosed as transmitting a text message to a single recipient; however, the network is capable of transmitting the message to multiple recipients, e.g., broadcasting the message. The sender could designate a single group identifier to identify all intended recipients. The network database would contain information that would identify each intended recipient that is included in the group identifier and information related to those individuals, e.g., the e-mail address for each recipient. The network would then send the message to each individual that is included in the group identifier.

The present invention is also not limited to transmitting the text message as an electronic mail message. As mentioned previously, the transmitted text message can also be a facsimile document. The speech recognition software would convert the spoken message to a text file. Known formatting software would convert the text file to a fax document. If the message is transmitted as a facsimile document, the recipient's receiving apparatus 130 could be a personal computer that is capable of receiving fax documents or could be a standardized facsimile machine. If the message is converted into a facsimile format, it would not be possible to attach wave files (.wav) or other files to the facsimile message, as can be done and as was described in the electronic mail context.

Additionally, it is not required that a receiving party of a voice mail message pre-indicate, i.e., before receipt of the voice mail message, their desires for receiving the message to network 120, e.g., as an electronic mail message or a voice mail message. If a voice mail message is received for an intended recipient and no information is stored in database 122 with respect to the recipient's desires for the format for the message, network 120 will deliver the voice mail message to the intended recipient's voice mail box. If the intended recipient then desires to receive the message as a text document, e.g., as an e-mail message or a facsimile document, the recipient will communicate their desires to network 120 and network 120 will convert and transmit the message to the intended recipient as a text document, as described previously.

As described above, a network-based voice messaging system is provided. The disclosed embodiments are illustrative of the various ways in which the present invention may be practiced. Other embodiments can be implemented by those skilled scope of the present invention.

What is claimed is:

1. A method for transmitting an oral message to an intended recipient comprising the steps of:

receiving at a network an oral message for an intended recipient from a sending party; and determining whether the recipients voice mailbox is full and, if the voice mail box was full, performing the following:

querying the sending party regarding the use of restricted domain speech recognition software and receiving a response;

converting the oral message to a text message using speech recognition software, wherein restricted domain speech recognition software is used if the sending party's response indicates that it should be used; and transmitting the text message to the intended recipient.

2. The method of claim 1, wherein said querying the sending party includes permitting the sending party to select from a menu of restricted domains.

3. The method of claim 1, wherein said text message is an electronic mail message.

4. The method of claim 1, wherein said text message is a facsimile document.

5. The method of claim 1, further determining whether the database has an entry corresponding to the intended recipient and, if not, creating an entry for the intended recipient in an intended recipient database based on the received voice message.

6. A method for transmitting an oral message to an intended recipient comprising the steps of:

receiving an oral message at a network for an intended recipient from a sending party;

determining a required format for transmitting the oral message to the intended recipient by said network;

converting the oral message to a text message;

converting said text message to a second oral message and providing the second oral message to the sending party prior to transmitting the text message to the intended recipient;

receiving oral correction information from the sending party prior to transmitting the text message to the intended recipient;

modifying said text message based on the correction information prior to transmitting the text message to the intended recipient; and transmitting the oral message to the intended recipient in the required format.

7. The method of claim 6, wherein receiving an oral message includes receiving addressing data that was entered by the sender on a telephone keypad.

8. The method of claim 6, wherein an intended recipient database has a record of whether said intended recipient pre-indicated use of restricted domain speech recognition software for messages sent to said intended recipient.

9. The method of claim 6, wherein the required format for transmitting the oral message was pre-indicated by the intended recipient.

10. The method of claim 6, wherein information identifying a destination for transmitting the oral message in the required format is provided orally by the sender of oral message in response to a prompt.

11. The method of claim 10, wherein the e-mail address of the intended recipient is determined based on the information entered by the sender in response to the prompt.

12. The method of claim 6, wherein said required format is determined based upon information provided by the sender of the oral message.

13. The method of claim 6, wherein the conversion of the oral message is performed using restricted domain speech recognition software that is activated based upon input provided by the sender of the oral message.

* * * * *